(12) United States Patent
Hsieh

(10) Patent No.: US 7,993,087 B2
(45) Date of Patent: Aug. 9, 2011

(54) THREADED MEMBER WITH ANTIRUST EFFECT

(76) Inventor: Chih-Ching Hsieh, Taichung Hsien (TW)

( * ) Notice: Subject to any disclaimer, the term of this patent is extended or adjusted under 35 U.S.C. 154(b) by 195 days.

(21) Appl. No.: 12/412,571

(22) Filed: Mar. 27, 2009

(65) Prior Publication Data

US 2010/0247269 A1  Sep. 30, 2010

(51) Int. Cl.
*F16B 35/04* (2006.01)
(52) U.S. Cl. ..................................... 411/424; 184/105.3
(58) Field of Classification Search .................. 411/424, 411/428, 383, 395, 548; 16/274; 384/396, 384/402; 184/105.3
See application file for complete search history.

(56) References Cited

U.S. PATENT DOCUMENTS

| | | | | |
|---|---|---|---|---|
| 1,159,779 A | * | 11/1915 | Landrau | 384/396 |
| 1,433,095 A | * | 10/1922 | Peary | 16/274 |
| 1,577,643 A | * | 3/1926 | Jorgensen et al. | 184/64 |
| 1,630,584 A | * | 5/1927 | Schneider | 238/161.5 |
| 2,562,649 A | * | 7/1951 | Steensen | 16/274 |
| 2,570,942 A | * | 10/1951 | Hadfield | 16/274 |
| 2,604,958 A | * | 7/1952 | Leufvenius | 184/105.3 |
| 2,788,221 A | * | 4/1957 | Pritchard | 280/93.507 |
| 3,407,903 A | * | 10/1968 | Sansabrino | 184/14 |
| 3,947,948 A | * | 4/1976 | Fredriksson et al. | 29/426.2 |

* cited by examiner

*Primary Examiner* — Gary Estremsky
(74) *Attorney, Agent, or Firm* — Guice Patents PLLC

(57) ABSTRACT

The present invention provides a threaded member with antirust effect. An oil reservoir is formed inside the threaded member and multiple conduits are formed on an outer circumference of the stem body of the threaded member in communication with the oil reservoir. An absorption material is installed in the oil reservoir and soaked with an antirust liquid. The antirust liquid in the oil reservoir can slowly seep out of the conduits to the outer circumference of the stem body so as to protect the threaded member from rust.

10 Claims, 3 Drawing Sheets

THREADED MEMBER WITH ANTIRUST EFFECT

FIELD OF THE INVENTION

The present invention is related generally to a threaded member, and more particularly to a threaded member with antirust effect.

BACKGROUND OF THE INVENTION

Most of the conventional threaded members are made of metal materials. The metal materials have high activity so that the threaded members tend to oxidize and rust when exposed to the atmosphere. Under such circumstance, the threaded members are often jammed in a work piece and hard to unscrew. Accordingly, more strength and time are necessary for forcedly unscrewing the rusted threaded members. In some cases, it is necessary to break the rusted threaded members or the work piece for removing the threaded members. This is quite inconvenient.

A conventional way to prevent the threaded member from rusting is such that the periphery of a threaded member can be oiled. However, after a period of use, the oil is likely to dry out and lose its antirust capability.

SUMMARY OF THE INVENTION

It is a primary object of the present invention to provide a threaded member with antirust effect.

It is a further object of the present invention to provide a threaded member, which can stay rustless for a long time.

According to the above objects, the threaded member with antirust effect of the present invention includes a head section and a stem body. An oil reservoir is formed inside the threaded member and multiple conduits are formed on an outer circumference of the stem body in communication with the oil reservoir. An absorption material is positioned in the oil reservoir and soaked with an antirust liquid.

The antirust liquid in the oil reservoir can slowly seep out of the conduits to the outer circumference of the stem body so as to protect the threaded member from rust for a long time.

The present invention can be best understood through the following description and accompanying drawings wherein:

DETAILED DESCRIPTION OF THE PREFERRED EMBODIMENTS

Figure 1:
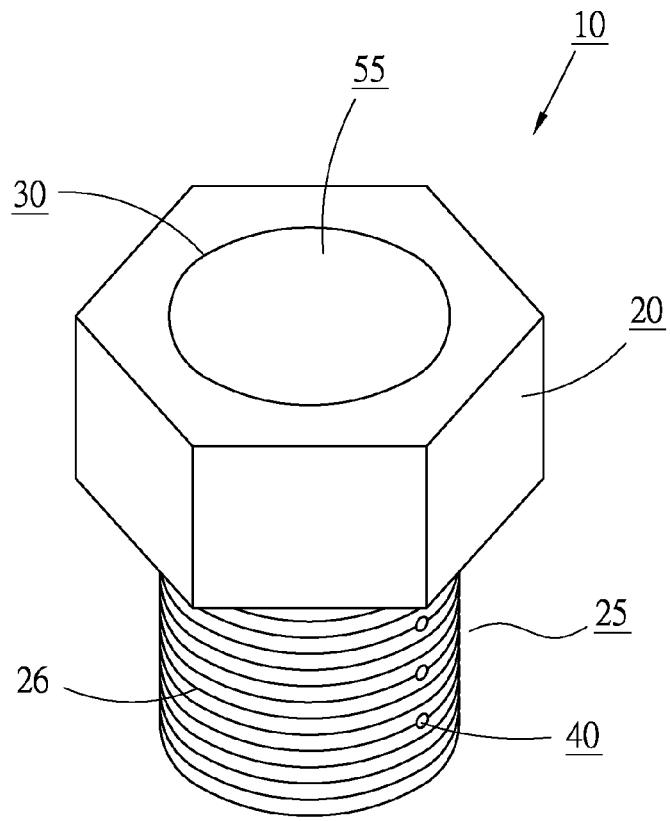
FIG. 1 is a perspective view of a first embodiment of the present invention.
Figure 2:
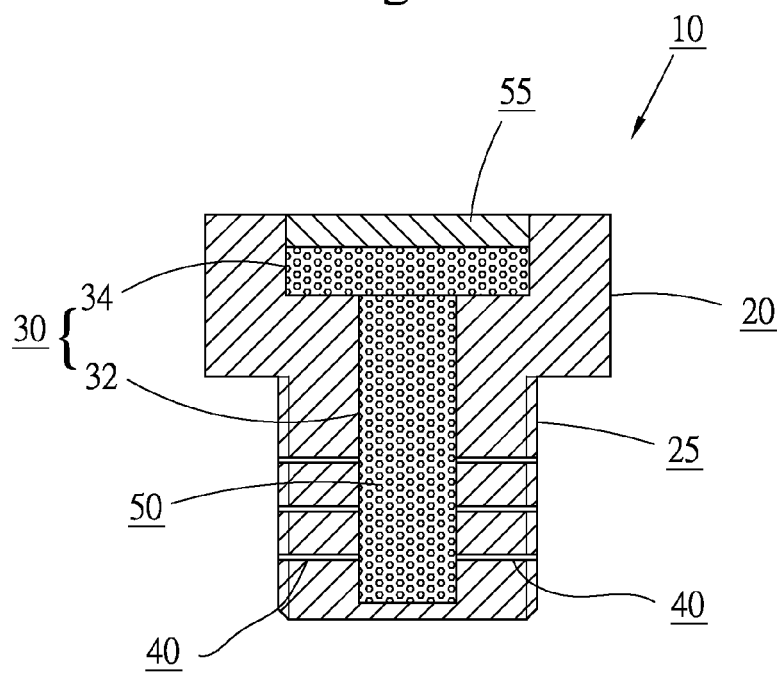
FIG. 2 is a longitudinally sectional view according to FIG. 1.

Please refer to FIGS. 1 and 2. According to a first embodiment, the threaded member 10 of the present invention includes a head section 20 and a stem body 25 connected with a bottom end of the head section. The head section 20 has an outer circumference with a polygonal configuration such as hexagonal configuration. The stem body 25 is disposed under the bottom end of the head section. An outer circumference of the stem body is formed with a thread 26.

The threaded member 10 further comprises an oil reservoir 30, multiple conduits 40 and an absorption material 50.

The oil reservoir 30 is formed inside the threaded member 10. The oil reservoir 30 has at least one opening formed on an outer surface of the threaded member 10. To speak more specifically, the oil reservoir 30 has a first space 32 and a second space 34 communicating with each other. The second space 34 is positioned in the head section 20 and extends to a top end of the threaded member 10 to form the opening. The first space 32 is mainly positioned in the stem body 25 in communication with the second space 34. Preferably, the second space 34 has a width larger than that of the first space 32. Alternatively, the oil reservoir 30 can be a space with a unified diameter.

The conduits 40 are formed on the outer circumference of the stem body 25 of the threaded member 10 at intervals. The conduits 40 inward extend to communicate with the first space 32 of the oil reservoir 30. In this embodiment, multiple rows of conduits 40, (for example, two or more rows of conduits 40), are arranged through the stem body 25 at equal intervals.

The absorption material 50 is made of porous polymer material or porous fiber material, such as sponge or fabric material, for absorbing an antirust liquid, such as a lubricant. The absorption material 50 is placed in the oil reservoir 30. In practice, the absorption material 50 is previously soaked with the lubricant and then positioned in the oil reservoir 30. Alternatively, the absorption material 50 is first placed into the oil reservoir 30 and then the lubricant is filled into the oil reservoir 30 to soak the absorption material 50 with the lubricant. The absorption material 50 is either fully filled in both the first and second spaces 32, 34, or only filled in the first space 32. Accordingly, the antirust liquid is filled in the oil reservoir 30.

A cap body 55 is disposed in the opening of the oil reservoir 30 to block the same. The cap body 55 serves to prevent the lubricant from flowing out of the opening and prevent the absorption material 50 from dropping out of the opening. The cap body 55 can be fixedly disposed in the opening or detachably disposed in the opening via such as screws.

In use, a wrench (not shown) can be fitted onto the head section 20 of the threaded member 10 to wrench the same.

When the threaded member 10 is screwed into a work piece, by means of capillarity, the lubricant in the oil reservoir 30 will be drawn along the conduits 40 to seep to the outer circumference of the stem body 25. The lubricant then forms a protective film coated on the surface of the stem body 25. Accordingly, the stem body 25 is lubricated with the lubricant and protected from oxidation and rust. Therefore, the threaded member will not jam in the threaded hole of a work piece.

Moreover, the lubricant is contained in the absorption material to slowly seep out rather than quickly flow out. Therefore, the absorption material can provide a long-term lubricating and rustproof effect for the outer surface of the threaded member. Even after a long period of use, the threaded member can remain rustless. Therefore, the threaded member can be easily unscrewed from the work piece without breaking the work piece or the threaded member.

Figure 3:
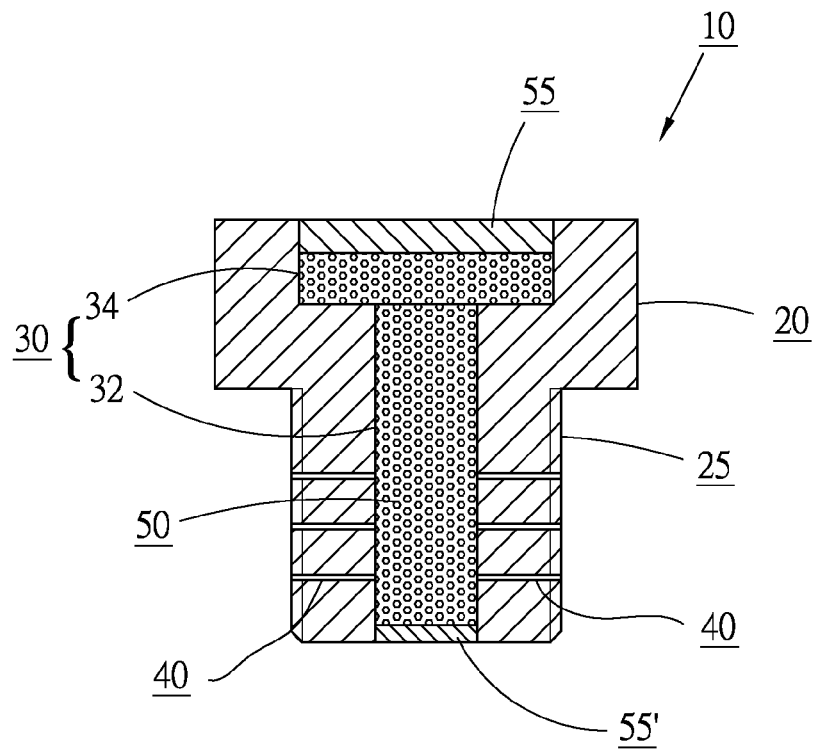
FIG. 3 is a longitudinally sectional view of a second embodiment of the present invention.

FIG. 3 shows a second embodiment of the threaded member 10' of the present invention, which is substantially identical to the first embodiment. The same components are denoted with the same reference numerals. In this embodiment, two ends of the oil reservoir 30 extend to the top end and bottom end of the threaded member 10' and are blocked with two cap bodies 55, 55' respectively.

Figure 4:
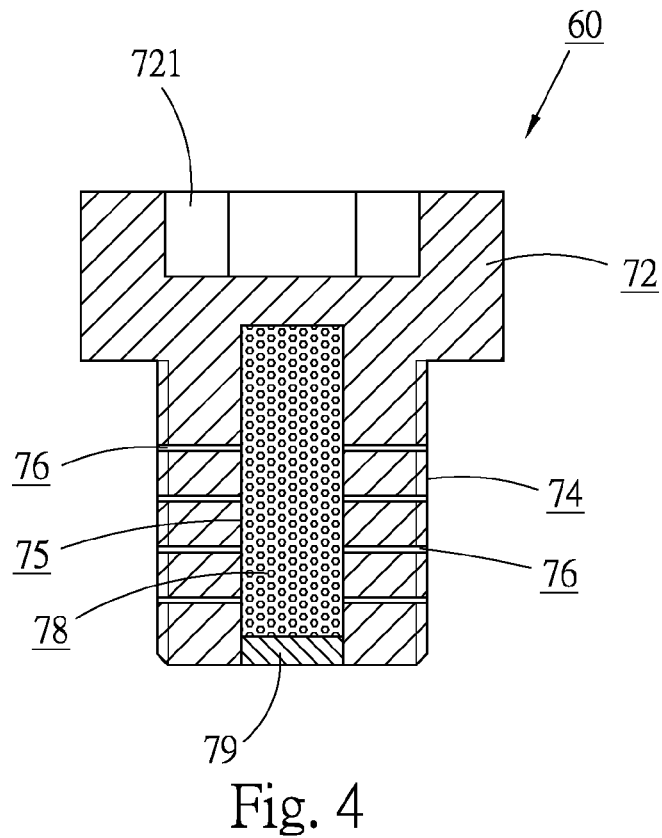
FIG. 4 is a longitudinally sectional view of a third embodiment of the present invention.

FIG. 4 shows a third embodiment of the threaded member 60 of the present invention, which also has a head section 72 and a stem body 74 connected therewith. An outer circumference of the stem body 74 is formed with a thread. An oil reservoir 75 is formed in the threaded member 60. Several conduits 76 are disposed on the circumference of the stem body 74 in communication with the oil reservoir 75. An absorption material 78 is positioned in the oil reservoir 75 and soaked with an antirust liquid.

In this embodiment, the opening of the oil reservoir 75 is formed on the bottom end of the stem body 74. A cap body 79 is disposed in the opening of the oil reservoir 75 to block the same.

Similarly, the antirust liquid can seep out from the conduits 76 to the outer surface of the stem body 74 to provide antirust effect.

In addition, the top end of the head section 72 is formed with a driven section 721 such as a hexagonal hole. A wrench can be fitted onto the outer circumference of the head section 72 to wrench the threaded member 60. Alternatively, a tool (such as a hexagonal wrench) can be fitted into the driven section 721 to wrench the threaded member 60.

Figure 5:
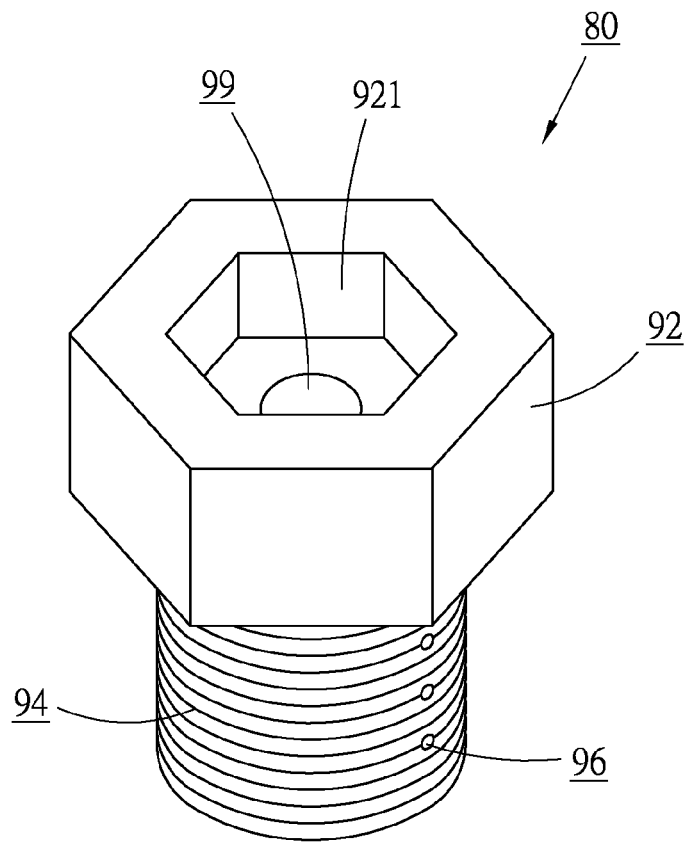
FIG. 5 is a perspective view of a fourth embodiment of the present invention.
Figure 6:
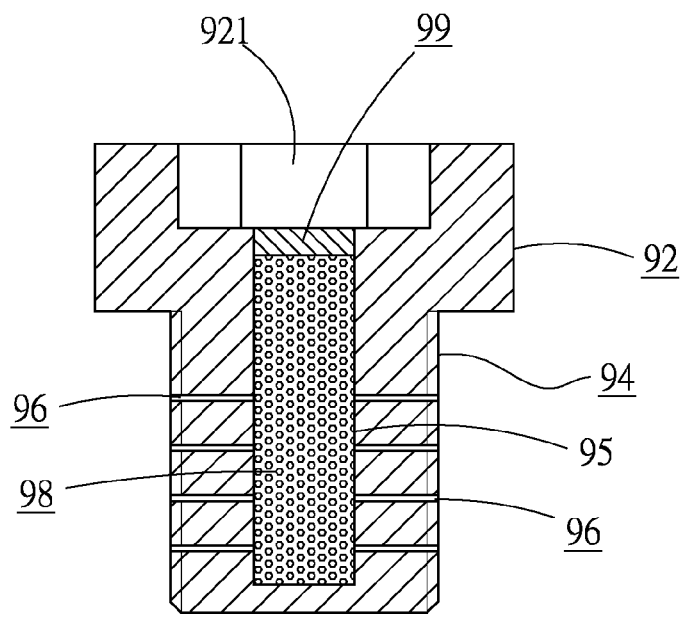
FIG. 6 is a longitudinally sectional view according to FIG. 5.

FIGS. 5 and 6 show a fourth embodiment of the threaded member 80 of the present invention, which also has a head section 92 and a stem body 94 connected therewith. An oil reservoir 95 is formed in the threaded member 80. Several conduits 96 are disposed on the circumference of the stem body 94 in communication with the oil reservoir 95. An absorption material 98 is positioned in the oil reservoir 95 and soaked with an antirust liquid.

The top end of the head section 92 is recessed to form a driven section 921, which is a hexagonal hole. The opening of the oil reservoir 95 is positioned in the head section 92 in communication with the driven section 921.

A cap body 99 is disposed between the opening of the oil reservoir 95 and the driven section 921 to seal the oil reservoir 95.

This embodiment can achieve the same effect as the above embodiments and thus will not be repeatedly described hereinafter.

It should be noted that a bottom opening of the oil reservoir 95 can be formed on the bottom end of the stem body 94.

The above embodiments are only used to illustrate the present invention, not intended to limit the scope thereof. Many modifications of the above embodiments can be made without departing from the spirit of the present invention.

What is claimed is:

1. A threaded member with antirust effect, comprising:
a head section; and
a stem body connected with a bottom end of the head section, the stem body having an outer circumference formed with a thread; said threaded member being characterized in that the threaded member further comprises:
an oil reservoir formed inside the threaded member;
a plurality of conduits formed on the outer circumference of the stem body in communication with the oil reservoir; and
an absorption material positioned in the oil reservoir and soaked with an antirust liquid, whereby the antirust liquid can seep out of the conduits to the outer circumference of the stem body;
wherein the oil reservoir has a first space and a second space in communication with each other, the first space being positioned in the stem body, while the second space being positioned in the head section; the conduits communicating with the first space;
wherein the absorption material is only filled in the first space.

2. The threaded member as claimed in claim 1, wherein the conduits are arranged in at least two rows and disposed on the stem body.

3. The threaded member as claimed in claim 1, wherein the absorption material is fiber material.

4. The threaded member as claimed in claim 1, wherein the absorption material is porous polymer material.

5. The threaded member as claimed in claim 1, wherein a top face of the head section is recessed to form a driven section.

6. A threaded member with antirust effect, comprising:
a head section; and
a stem body connected with a bottom end of the head section, the stem body having an outer circumference formed with a thread; said threaded member being characterized in that the threaded member further comprises:
an oil reservoir formed inside the threaded member;
a plurality of conduits formed on the outer circumference of the stem body in communication with the oil reservoir; and
an absorption material positioned in the oil reservoir and soaked with an antirust liquid, whereby the antirust liquid can seep out of the conduits to the outer circumference of the stem body;
wherein the oil reservoir has an opening positioned on the head section of the threaded member, the threaded member further comprising a cap body for blocking the opening of the oil reservoir;
wherein a top face of the head section is recessed to form a polygonal driven section; the opening of the oil reservoir is in communication with the driven section; the cap body is disposed between the opening and the driven section.

7. The threaded member as claimed in claim 6, wherein the oil reservoir has a first space and a second space in communication with each other, the first space being positioned in the stem body, while the second space being positioned in the head section; the conduits communicating with the first space.

8. The threaded member as claimed in claim 6, wherein the conduits are arranged in at least two rows and disposed on the stem body.

9. The threaded member as claimed in claim 6, wherein the absorption material is fiber material.

10. The threaded member as claimed in claim 6, wherein the absorption material is porous polymer material.

* * * * *